US008644878B2

(12) United States Patent
Lee et al.

(10) Patent No.: US 8,644,878 B2
(45) Date of Patent: Feb. 4, 2014

(54) APPARATUS AND METHOD FOR OPERATION ACCORDING TO SQUEEZING IN PORTABLE TERMINAL

(75) Inventors: Jae-Myeon Lee, Yongin-si (KR);
Hyun-Su Hong, Seongnam-si (KR);
Byeng-Sang Jung, Suwon-si (KR);
Hee-Jun Song, Yongin-si (KR);
Soon-Youl Kwon, Suwon-si (KR);
Sun-Young Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/193,368

(22) Filed: Jul. 28, 2011

(65) Prior Publication Data
US 2012/0028683 A1 Feb. 2, 2012

(30) Foreign Application Priority Data

Jul. 28, 2010 (KR) ........................ 10-2010-0072662

(51) Int. Cl.
*H04M 1/00* (2006.01)
(52) U.S. Cl.
USPC ..... 455/550.1; 455/410; 455/411; 455/414.1;
455/418; 455/556.2; 455/575.1; 382/115;
382/118; 382/120; 382/121; 382/313; 345/160;
345/169; 345/172; 345/173; 379/428.01;
379/433.01; 379/433.04
(58) Field of Classification Search
USPC ............... 455/418, 550.1, 575.1–575.8, 90.3,
455/66.1, 410, 411, 556.1, 556.2, 566, 565;
382/115, 118, 120, 121, 122, 312, 313;
345/160, 169, 172, 173; 379/428.01,
379/428.03, 433.01, 433.04, 433.06,
379/433.07, 433.11, 133.12
See application file for complete search history.

(56) References Cited

U.S. PATENT DOCUMENTS

| 2008/0090537 | A1* | 4/2008 | Sutardja .................... 455/232.1 |
| 2010/0007518 | A1 | 1/2010 | Kang et al. |
| 2010/0090564 | A1 | 4/2010 | Oh et al. |
| 2010/0099394 | A1* | 4/2010 | Hainzl ......................... 455/418 |
| 2010/0177037 | A1 | 7/2010 | Kim et al. |
| 2011/0151934 | A1* | 6/2011 | Geng ........................... 455/565 |

FOREIGN PATENT DOCUMENTS

| JP | 2006018503 | 1/2006 |
| KR | 1020060120762 | 11/2006 |
| KR | 10-2008-0099899 | 11/2008 |
| KR | 1020100039957 | 4/2010 |

OTHER PUBLICATIONS

International Search Report dated Feb. 29, 2012 in connection with International Patent Application No. PCT/KR2011/005567.
Written Opinion of the International Searching Authority dated Feb. 29, 2012 in connection with International Patent Application No. PCT/KR2011/005567.

* cited by examiner

*Primary Examiner* — Vladimir Magloire
*Assistant Examiner* — Babar Sarwar

(57) ABSTRACT

A method and apparatus perform pressure detection in a mobile terminal. method determines a squeezing pressure of the mobile terminal. The method determines whether a user squeezes the mobile terminal using the squeezing pressure determined and a value of a proximity sensor. The method transitions the mobile terminal to a wakeup state in response to determining that the user squeezed the mobile terminal.

26 Claims, 5 Drawing Sheets

APPARATUS AND METHOD FOR OPERATION ACCORDING TO SQUEEZING IN PORTABLE TERMINAL

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Jul. 28, 2010 and assigned Serial No. 10-2010-0072662, the entire disclosure of which is hereby incorporated by reference.

TECHNICAL FIELD OF THE INVENTION

The present invention relates to an apparatus and a method for detecting a user's operation of gripping a mobile terminal using a pressure sensor and a proximity sensor to allow the mobile terminal to make a transition to a wakeup state or a hot key access activation state.

BACKGROUND OF THE INVENTION

When a mobile terminal is in a sleep mode state or a lock mode state, the following operation has been performed in order to wake up the mobile terminal.

When the mobile terminal is a folder type mobile terminal, a user wakes up the mobile terminal by opening a closed folder or pressing a predetermined button of the mobile terminal.

When the mobile terminal is a slide type mobile terminal, a user wakes up the mobile terminal by raising up a shut down slide or pressing a predetermined button of the mobile terminal.

When the mobile terminal is a bar type mobile terminal, a user wakes up the mobile terminal by pressing a hold key for a predetermined time.

Among them, unlike a folder type or slide type mobile terminal, the bar type mobile terminal cannot intuitively transfer a current state of the mobile terminal to a user except pressing a hold key due to its characteristic.

However, this method causes inconvenience that a user has to press the hold key in person, and the user cannot immediately use a hot key of the mobile terminal, so that the user cannot instantly obtain a feedback from the mobile terminal.

In addition, this method is contradictory to a characteristic of a design of reducing the number of buttons.

SUMMARY OF THE INVENTION

To address the above-discussed deficiencies of the prior art, it is a primary object to provide at least the advantages described below. Accordingly, an aspect of the present disclosure is to provide an apparatus and a method for operation according to squeezing in portable terminal.

Another aspect of the present disclosure is to provide an apparatus and a method for easily waking up a mobile terminal or allowing a hot key of the mobile terminal to be immediately used even when a user does not press a different key through a user's motion of gripping the mobile terminal.

In accordance with an aspect of the present disclosure, an operating method for pressure detection in a mobile terminal is provided. The method includes determining a squeezing pressure of the mobile terminal, determining whether a user squeezes the mobile terminal using the squeezing pressure determination value and a determination value of a proximity sensor, and when the user squeezes the mobile terminal, waking up the mobile terminal.

In accordance with another aspect of the present disclosure, an apparatus of a mobile terminal, for performing an operation corresponding to pressure detection is provided. The apparatus includes a pressure sensor for determining a squeezing pressure, a proximity sensor for determining a proximity state, and a controller for determining whether a user squeezes the mobile terminal using a squeezing pressure determination value and a determination value of the proximity sensor, and when the user squeezes the mobile terminal, waking up the mobile terminal.

In accordance with still another aspect of the present disclosure, an operating method for pressure detection in a mobile terminal is provided. The method includes determining a squeezing pressure of the mobile terminal, determining whether a user squeezes the mobile terminal using the squeezing pressure determination value, when the user squeezes the mobile terminal, determining whether the user stops squeezing the mobile terminal using the squeezing pressure determination value and a determination value of a proximity sensor, and when the user stops squeezing the mobile terminal, waking up the mobile terminal.

In accordance with further another aspect of the present disclosure, an apparatus of a mobile terminal, for performing an operation corresponding to pressure detection is provided. The apparatus includes a pressure sensor for determining a squeezing pressure, a proximity sensor for determining a proximity state, and a controller for determining whether a user squeezes the mobile terminal using the squeezing pressure determination value, when the user squeezes the mobile terminal, determining whether the user stops squeezing the mobile terminal using the squeezing pressure determination value and a determination value of the proximity sensor, and when the user stops squeezing the mobile terminal, waking up the mobile terminal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present disclosure provide an apparatus and a method for operation according to squeezing in portable terminal.

Figure 1:
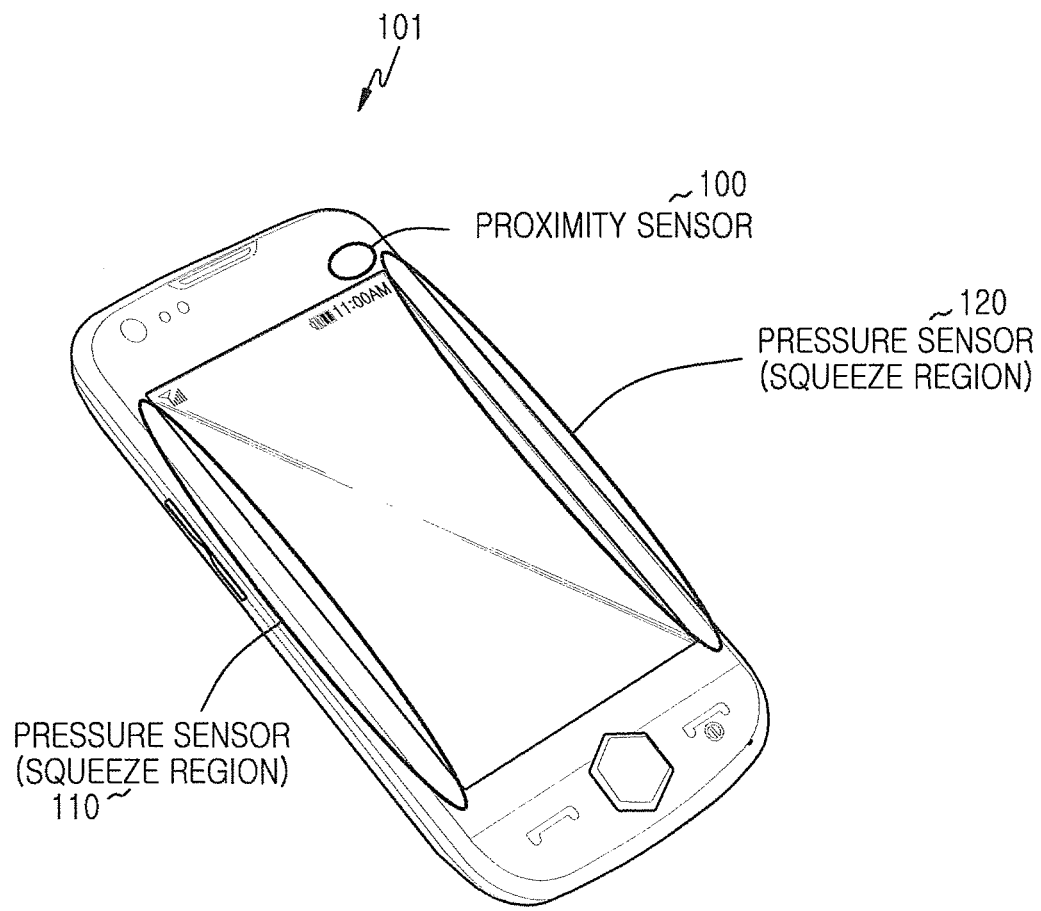
FIG. 1 is a view schematically illustrating a mobile terminal according to an embodiment of the present disclosure.

FIG. 1 is a view schematically illustrating a mobile terminal according to an embodiment of the present disclosure.

Referring to FIG. 1, pressure sensors 110 and 120 for determining a squeezing pressure are mounted around mobile terminal 101. The mobile terminal 101 may determine whether the mobile terminal 101 is placed in a pocket or a bag using a proximity sensor 100.

According to an embodiment of the present disclosure, depending on a type, the pressure sensors 110 and 120 may have a gradually decreasing or increasing value depending on the intensity of a detected pressure.

In addition, the pressure sensors 110 and 120 may be pressure sensors that return a determined pressure value in an example where a user grips the mobile terminal 101 to apply the pressure thereto and then releases the applied pressure.

When pressure values determined by the pressure sensors 110 and 120 are used, the pressure values determined by the pressure sensors 110 and 120 include a value at a "No load" state" and a value at a "Pre load" state. Accordingly, when the determined pressure values are used, the value at the "No load" state and the value at the "Pre load" state should be considered. Here, the "No load" state denotes a value at a state where no load exists, that is, an initial value. Also, the value at the "Pre load" state denotes a load value already applied.

However, it is obvious that the present disclosure is not limited by the type of a pressure sensor.

Figure 2:
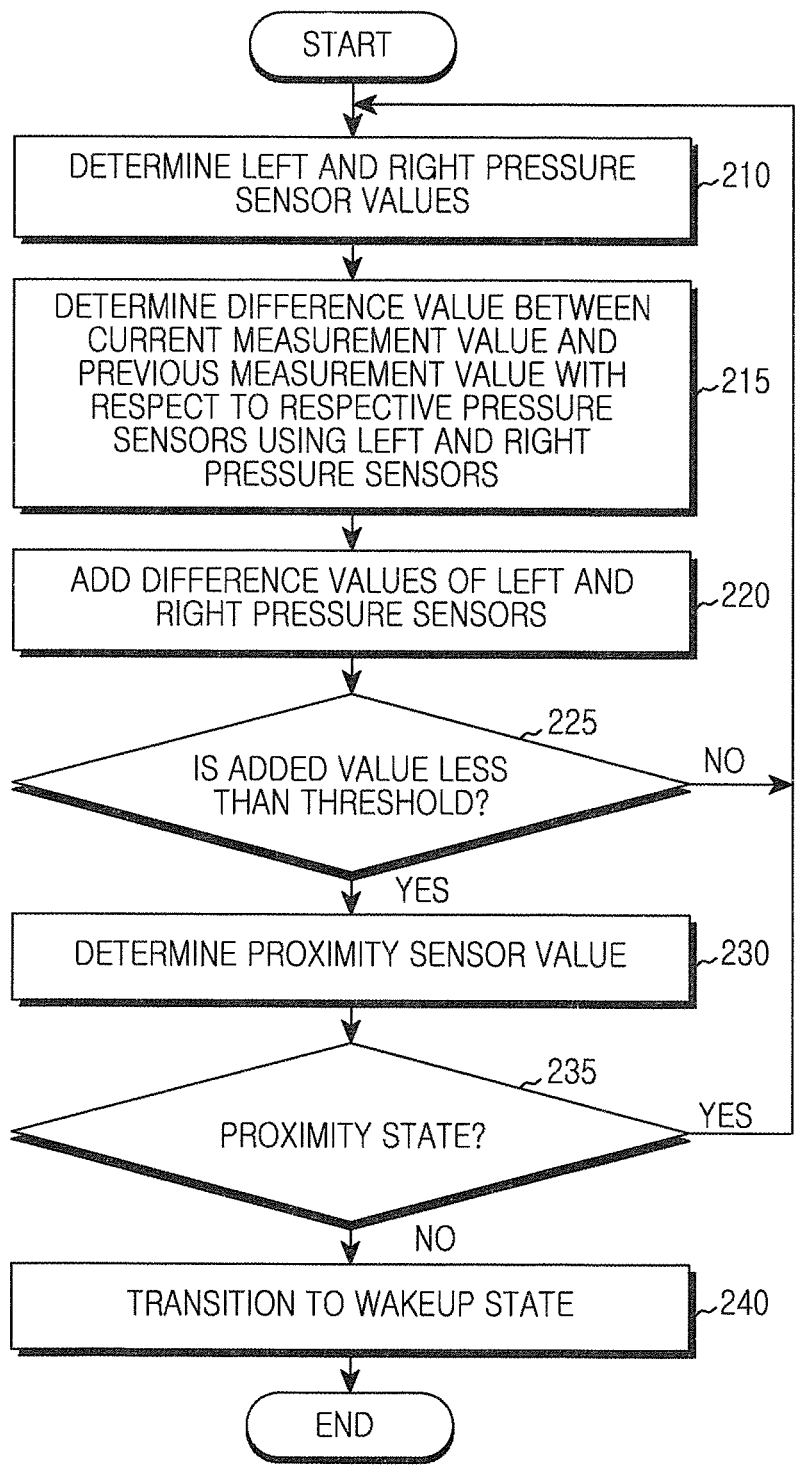
FIG. 2 is a flowchart illustrating an operation of a mobile terminal according to an embodiment of the present disclosure.

FIG. 2 is a flowchart illustrating an operation of a mobile terminal according to an embodiment of the present disclosure.

Referring to FIG. 2, the mobile terminal determines a user's squeezing pressure using left and right pressure sensors in block 210. The mobile terminal determines a difference between a current pressure determination value and a previous pressure determination value corresponding to a time flow with respect to respective pressure sensors using the left and right pressure sensors in block 215, and adds the determined left and right difference values in block 220.

When the added value is not less than a threshold in block 225, that is, when the mobile terminal is pressed by a different object instead of a user's squeezing, the mobile terminal determines left and right pressure sensor values again in block 210.

When the difference value is less than the threshold in block 225, that is, when the user squeezes the mobile terminal, the mobile terminal determines proximity using a proximity sensor in block 230.

Here, in the example of the difference value being less than the threshold, when detecting a pressure, the pressure sensor outputs a determination value less than zero. In addition, according to an embodiment of the present disclosure, expression of less than the threshold denotes outside of a predetermined threshold value range.

In the example where a determination value of the proximity sensor represents a proximity state in block 235, that is, in the example where the mobile terminal is placed in a bag or a pocket, the mobile terminal starts to determine left and right pressure sensor values in block 210.

In the situation where a determination value of the proximity sensor does not represent the proximity state in block 235, that is, in the example where a user carries the mobile terminal on their person and the mobile terminal is not placed in a bag or a pocket, the mobile terminal makes a transition to a wakeup state in block 240, or activates a hot key menu access.

Figure 3A:
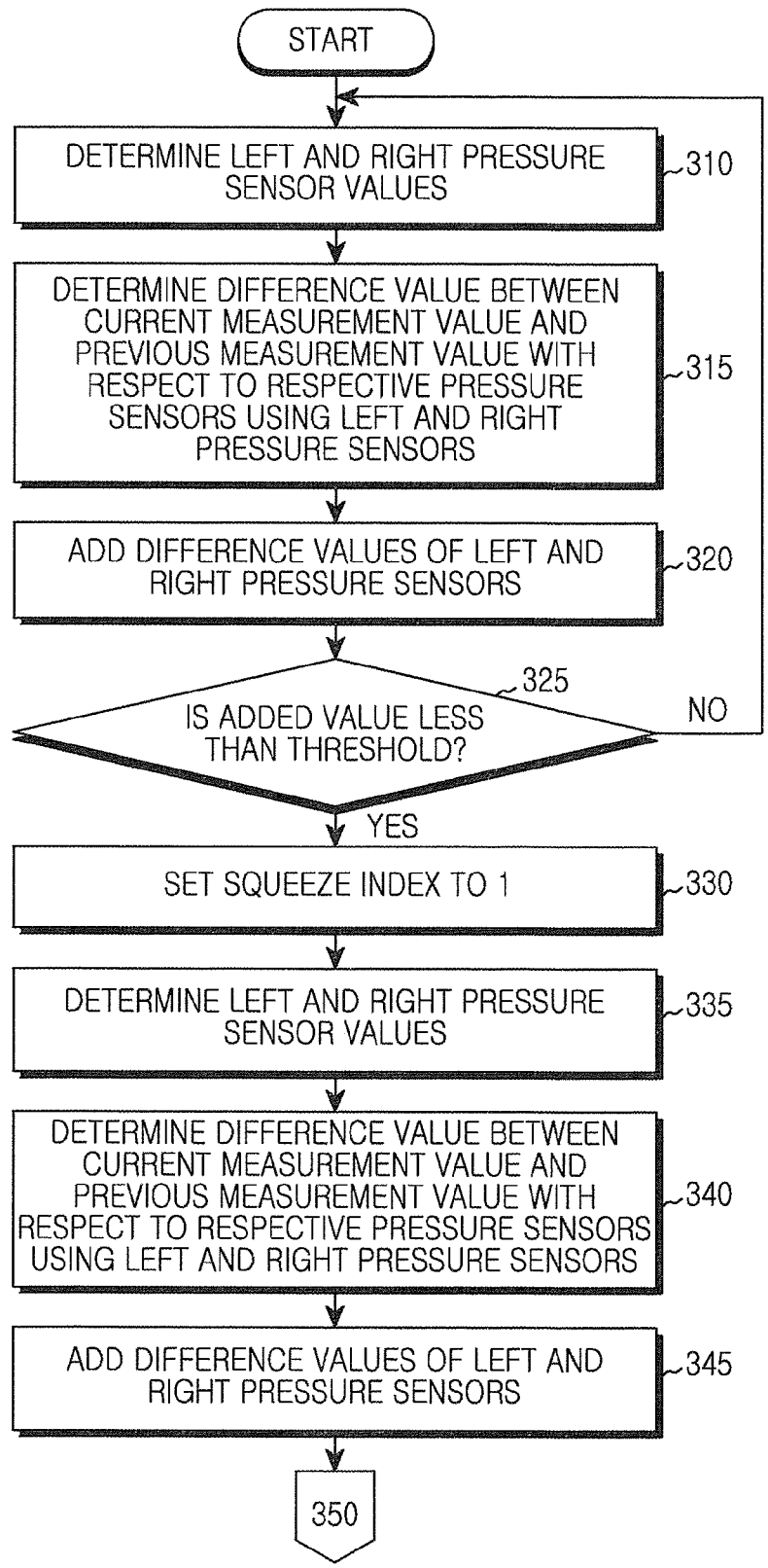
FIG. 3A is a flowchart illustrating an operation of a mobile terminal according to an embodiment of the present disclosure.
Figure 3B:
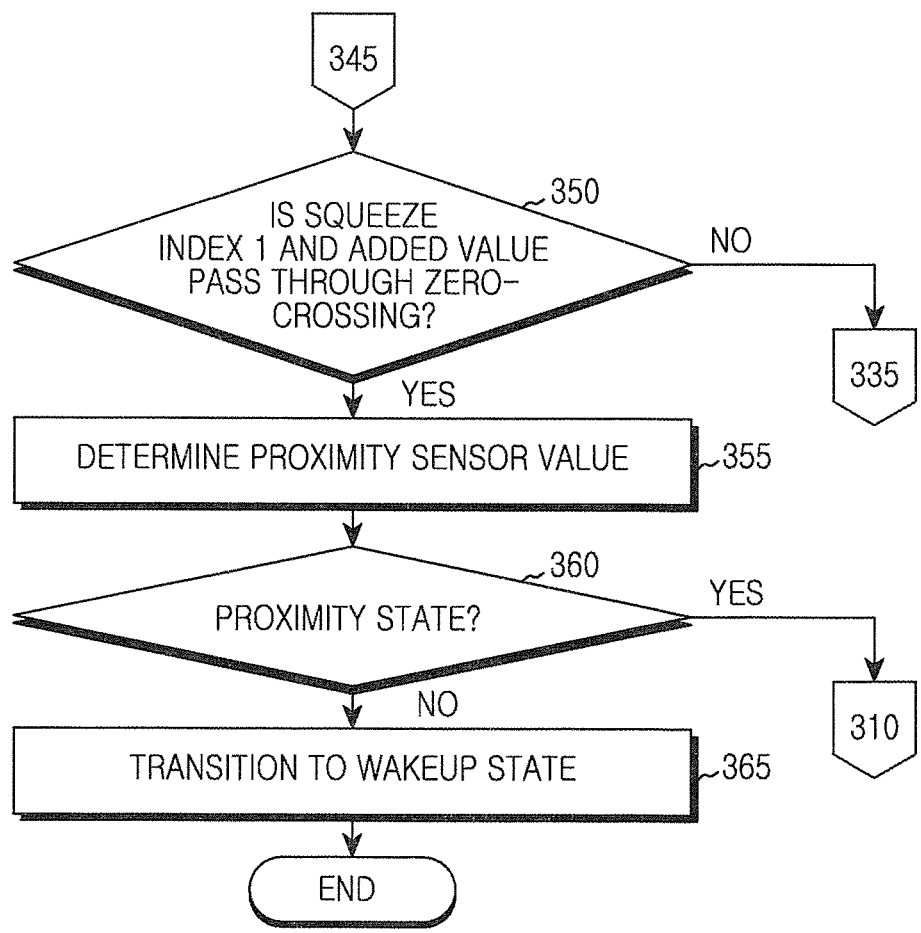
FIG. 3B is a flowchart illustrating an operation of a mobile terminal according to an embodiment of the present disclosure.

FIG. 3A is a flowchart illustrating an operation of a mobile terminal according to an embodiment of the present disclosure and FIG. 3B is a flowchart illustrating an operation of a mobile terminal according to an embodiment of the present disclosure.

Referring to FIG. 3, the mobile terminal determines a user's squeezing pressure using left and right pressure sensors in block 310. The mobile terminal determines a difference between a current pressure determination value and a previous pressure determination value corresponding to a time flow with respect to respective pressure sensors using the left and right pressure sensors in block 315, and adds the determined left and right difference values in block 320.

When the added value is not less than a threshold in block 325, that is, when the mobile terminal is pressed by a different object instead of a user's squeezing, the mobile terminal starts to determine left and right pressure sensor values again in block 310.

When the difference value is less than the threshold in block 325, that is, when the user squeezes the mobile terminal, the mobile terminal sets a squeeze index value to one in block 330. This situation, as described above, corresponds to an example where the pressure sensor is a sensor that returns a pressure determination value when a pressure is not detected after detecting the pressure.

The mobile terminal determines a user's squeezing pressure using left and right pressure sensors in block 335. In addition, the mobile terminal determines a difference between a current pressure determination value and a previous pressure determination value corresponding to a time flow with respect to respective pressure sensors using the left and right pressure sensors in block 340, and adds the determined left and right difference values in block 345.

When, the added value does not represent zero-crossing, or the squeeze index is not one in block 350, that is, the mobile terminal does not determine that a user has gripped the mobile terminal to apply pressure thereto and then released the pressure, the mobile terminal starts to determine left and right pressure sensor values again in block 335.

When the added value represents the zero-crossing and the squeeze index is one in block 350, that is, the mobile terminal determines that the user has gripped the mobile terminal to apply pressure thereto and then released the pressure, the mobile terminal determines proximity using a proximity sensor in block 355.

The zero-crossing denotes an example where the added value passes by zero. In this example, where the user grips the mobile terminal to apply pressure thereto and then loosens the gripping to release the applied pressure, and when the added value is less than the threshold, the squeeze index is set to one, and then the added value passes by zero.

When the determination value of the proximity sensor represents a proximity state in block 360, that is, when the mobile terminal is placed in a bag or a pocket, the mobile terminal determines left and right pressure sensor values in block 310.

When, the determination value of the proximity sensor does not represent the proximity state in block 360, that is, the user carries the mobile terminal on their person and so the mobile terminal is not placed in a bag or a pocket, the mobile terminal makes a transition to a wakeup state in block 365, or activates a hot key menu access.

The above process represents that in the example where the user performs an operation of gripping the mobile terminal and loosening the pipping, the mobile terminal makes a transition to the wakeup state in block 365 or activates a hot key menu access.

Figure 4:
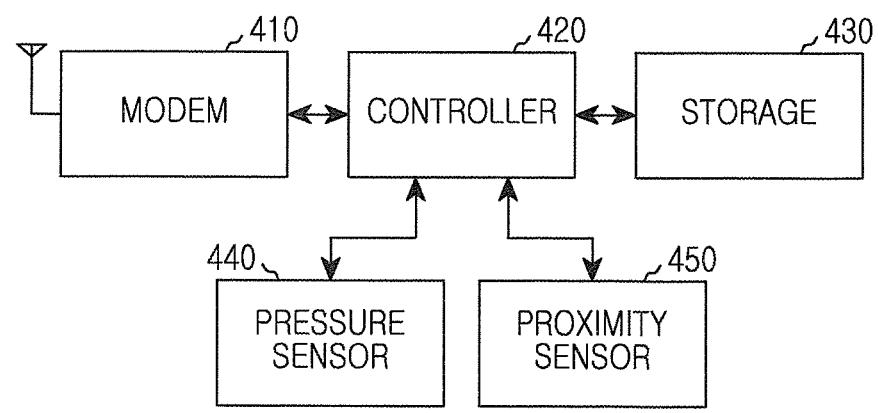
FIG. 4 is a block diagram illustrating a mobile terminal according to an embodiment of the present disclosure.

FIG. 4 is a block diagram illustrating a mobile terminal according to an embodiment of the present disclosure.

Referring to FIG. 4, the mobile terminal includes a modem 410, a controller 420, a storage 430, pressure sensor 440, and a proximity sensor 450. Here, the pressure sensor 440 is positioned at the left and right sides of the mobile terminal, respectively.

The modem 410 is a module for communicating with a different apparatus, and includes a radio processor and a baseband processor. The radio processor converts a signal received via an antenna into a baseband signal to provide the same to the baseband processor, converts a baseband signal from the baseband processor into a Radio Frequency (RF) signal so that the RF signal may be transmitted on an RF path, and transmits the same via the antenna.

The storage 430 stores programs for controlling an overall operation of the mobile terminal and temporary data occurring during execution of programs.

The pressure sensor 440 determines a pressure and returns a determination value to the controller 420. When detecting a pressure, the pressure sensor 440 may return the relevant determination value, or after detecting a pressure, when the relevant pressure is not detected, the pressure sensor 440 may return the relevant determination value.

The proximity sensor 450 differentiates between a situation where the proximity sensor 450 is hidden by a person or an object and a situation where the proximity sensor 450 is not hidden, and returns different determination values.

The controller 420 controls an overall operation of the mobile terminal. For example, the controller 420 performs processes and controls for voice communication and packet communication. More particularly, the controller 420 controls the pressure sensor 440 and the proximity sensor 450.

The controller 420 determines a user's squeezing pressure using the pressure sensors 440 positioned at left and right sides, and determines a difference between a current pressure determination value and a previous pressure determination value corresponding to a time flow with respect to respective pressure sensors 440 using the left and right pressure sensors 440, and adds the determined left and right difference values.

When the added value is not less than a threshold, the controller 420 starts to determine a value of the pressure sensor 440 positioned at left and right sides again.

When the difference value is less than the threshold, the controller 420 determines proximity using the proximity sensor 450.

When a determination value of the proximity sensor 450 represents a proximity state, the controller 420 starts to determine a value of the pressure sensors 440 positioned at left and right sides.

When the determination value of the proximity sensor 450 does not represent the proximity state, the controller 420 makes a transition to a wakeup state, or activates a hot key menu access.

In addition, the controller 420 may perform the following operation.

The controller 420 determines the user's squeezing pressure using the pressure sensors 440 positioned at left and right sides, and determines a difference between a current pressure determination value and a previous pressure determination value corresponding to a time flow with respect to respective pressure sensors 440 using the left and right pressure sensors 440, and adds the determined left and right difference values.

When the added value is not less than a threshold, the controller 420 starts to determine a value of the pressure sensors 440 positioned at left and right sides again.

When the added value is less than the threshold, the controller 420 sets a squeeze index value to 1 and determines the user's squeezing pressure using the pressure sensors 440 positioned at left and right sides.

The controller 420 determines a difference between a current pressure determination value and a previous pressure determination value corresponding to a time flow with respect to respective pressure sensors 440 using the left and right pressure sensors 440, and adds the determined left and right difference values.

When the added value does not represent zero-crossing, or the squeeze index is not one, the controller 420 starts to determine left and right pressure sensor values again.

When the added value represents zero-crossing and the squeeze index is one, the controller 420 determines proximity using the proximity sensor 450.

When a determination value of the proximity sensor 450 represents a proximity state, the controller 420 starts to determine left and right pressure sensor values again.

When the determination value of the proximity sensor 450 does not represent the proximity state, the controller 420 makes a transition to a wakeup state or activates a hot key menu access.

According to embodiments of the present disclosure, a user may wake up a mobile terminal or immediately use a hot key even without pressing a key in the bar type mobile terminal.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for pressure detection in a mobile terminal, the method comprising:

determining a squeezing pressure on an edge of the mobile terminal using a left pressure sensor disposed at a left edge of the mobile terminal and a right pressure sensor disposed at a right edge of the mobile terminal;

determining whether a user squeezed the mobile terminal based on the squeezing pressure determined and a value of a proximity sensor; and responsive to determining that the user squeezed the mobile terminal, transitioning the mobile terminal to a wakeup state, wherein determining whether the user squeezed the mobile terminal based on the squeezing pressure determined comprises determining whether the squeezing pressure determined is within a threshold.

2. The method of claim 1, further comprising:

responsive to determining that the user squeezed the mobile terminal, activating a menu access of the mobile terminal.

3. The method of claim 1, wherein determining whether the user squeezed the mobile terminal based on the squeezing pressure determined and the value of the proximity sensor comprises:

determining a first difference value between a first squeezing pressure value received from the left pressure sensor and a previous squeezing pressure value received from the left pressure sensor;

determining a second difference value between a first squeezing pressure value received from the right pressure sensor and a previous squeezing pressure value received from the right pressure sensor;

adding the first and second difference values to determine the squeezing pressure; and determining the value of the proximity sensor.

4. The method of claim 1, wherein determining whether the user squeezed the mobile terminal comprises:

determining a difference between squeezing pressures determined according to time; and determining whether the value of the proximity sensor represents that the mobile terminal is on the user, wherein the proximity sensor is configured to determine whether a portion of the mobile terminal is covered.

5. The method of claim 4, wherein determining whether the user squeezed the mobile terminal further comprises:

determining whether the difference between the squeezing pressures determined according to time is outside a predetermined threshold.

6. An apparatus of a mobile terminal, the apparatus comprising:

at least one pressure sensor configured to determine a squeezing pressure on an edge of the mobile terminal using a left pressure sensor disposed at a left edge of the mobile terminal and a right pressure sensor disposed at a right edge of the mobile terminal;

a proximity sensor configured to determine a proximity state; and a controller configured to determine whether a user squeezed the mobile terminal based on the squeezing pressure and a value of the proximity sensor, and to transition the mobile terminal to a wakeup state in response to determining that the user squeezed the mobile terminal, wherein in determining whether the user squeezed the mobile terminal based on the squeezing pressure the controller is further configured to determine whether the squeezing pressure determined is within a threshold.

7. The apparatus of claim 6, wherein the controller is further configured to activate a menu access of the mobile terminal in response to determining that the user squeezed the mobile terminal.

8. The apparatus of claim 6, wherein the controller is further configured to determine a first difference value between a first squeezing pressure value received from the left pressure sensor and a previous squeezing pressure value received from the left pressure sensor, to determine a second difference value between a first squeezing pressure value received from the right pressure sensor and a previous squeezing pressure value received from the right pressure sensor, to add the first and second difference values to determine the squeezing pressure, and to determine a value of the proximity sensor.

9. The apparatus of claim 6, wherein, in determining whether the user squeezed the mobile terminal, the controller is further configured to determine a difference between squeezing pressures determined according to time, and to determine whether the value of the proximity sensor represents that the mobile terminal is on the user, and wherein the proximity sensor is configured to determine whether a portion of the mobile terminal is covered.

10. The apparatus of claim 9, wherein, in determining whether the user squeezed the mobile terminal, the controller is further configured to determine whether the difference between the squeezing pressures determined according to time is outside a predetermined threshold.

11. A method for pressure detection in a mobile terminal, the method comprising:

determining a squeezing pressure on an edge of the mobile terminal using a left pressure sensor disposed at a left edge of the mobile terminal and a right pressure sensor disposed at a right edge of the mobile terminal;

determining whether a user squeezes the mobile terminal based on based on the squeezing pressure determined;

responsive to determining that the user squeezes the mobile terminal, determining whether the user stops squeezing the mobile terminal based on the squeezing pressure of the mobile terminal and a value of a proximity sensor; and responsive to determining that the user stopped squeezing the mobile terminal, transitioning the mobile terminal to a wakeup state.

12. The method of claim 11, further comprising:

responsive to determining that the user stopped squeezing the mobile terminal, activating a menu access of the mobile terminal.

13. The method of claim 11, wherein the determining whether the user squeezes the mobile terminal based on the squeezing pressure determined comprises:

determining a first difference value between a first squeezing pressure value received from the left pressure sensor and a previous squeezing pressure value received from the left pressure sensor;

determining a second difference value between a first squeezing pressure value received from the right pressure sensor and a previous squeezing pressure value received from the right pressure sensor; and adding the first and second difference values to determine the squeezing pressure.

14. The method of claim 11, wherein determining whether the user squeezes the mobile terminal comprises:

determining a difference between squeezing pressures determined according to time.

15. The method of claim 14, wherein determining whether the user squeezes the mobile terminal further comprises:

determining whether the difference between the squeezing pressures determined according to time is outside a predetermined threshold.

16. The method of claim 11, wherein determining whether the user stops squeezing the mobile terminal based on the squeezing pressure and the value of the proximity sensor comprises:

determining a difference between squeezing pressures determined according to time; and determining the value of the proximity sensor, wherein the proximity sensor is configured to determine whether a portion of the mobile terminal is covered.

17. The method of claim 11, wherein determining whether the user stops squeezing the mobile terminal comprises:

determining a difference between squeezing pressures determined according to time; and determining whether the value of the proximity sensor represents that the mobile terminal is on the user.

18. The method of claim 17, wherein determining whether the user stops squeezing the mobile terminal further comprises:

determining whether the difference between squeezing pressures determined according to time is a negative value.

19. An apparatus of a mobile terminal for performing an operation corresponding to pressure detection, the apparatus comprising:

at least one pressure sensor configured to determine a squeezing pressure on an edge of the mobile terminal using a left pressure sensor disposed at a left edge of the mobile terminal and a right pressure sensor disposed at a right edge of the mobile terminal;

a proximity sensor configured to determine a proximity state; and a controller configured to determine whether a user squeezed the mobile terminal based on the squeezing pressure, to determine whether the user stops squeezing the mobile terminal based on the squeezing pressure and a value of the proximity sensor in response to determining that the user squeezed the mobile terminal, and to transition the mobile terminal to a wakeup state in response to determining that the user stopped squeezing the mobile terminal.

20. The apparatus of claim 19, wherein the controller is configured to activate a menu access of the mobile terminal in response to determining that the user stopped squeezing the mobile terminal.

21. The apparatus of claim 19, wherein the controller is configured to determine a first difference value between a first squeezing pressure value received from the left pressure sensor and a previous squeezing pressure value received from the left pressure sensor, to determine a second difference value between a first squeezing pressure value received from the right pressure sensor and a previous squeezing pressure value received from the right pressure sensor, and to add the first and second difference values to determine the squeezing pressure.

22. The apparatus of claim 19, wherein in determining whether the user squeezed the mobile terminal, the controller is further configured to determine a difference between squeezing pressures determined according to time.

23. The apparatus of claim 22, wherein in determining whether the user squeezed the mobile terminal, the controller is further configured to determine whether the difference between the squeezing pressures determined according to time is outside a predetermined threshold.

24. The apparatus of claim 19, wherein the controller is further configured to determine a difference between squeezing pressures determined according to time and to determine the value of the proximity sensor, and wherein the proximity sensor is configured to determine whether a portion of the mobile terminal is covered.

25. The apparatus of claim 19, wherein, in determining whether the user stops squeezing the mobile terminal, the controller is further configured to determine a difference between squeezing pressures determined according to time and to determine whether the value of the proximity sensor represents that the mobile terminal is on the user.

26. The apparatus of claim 25, wherein, in determining whether the user stops squeezing the mobile terminal, the controller is further configured to determine whether the difference between squeezing pressures determined according to time represents is a negative value.

* * * * *